March 5, 1957　　　W. W. ANDERSON　　　2,783,518
SNAP HOOK
Filed April 1, 1955
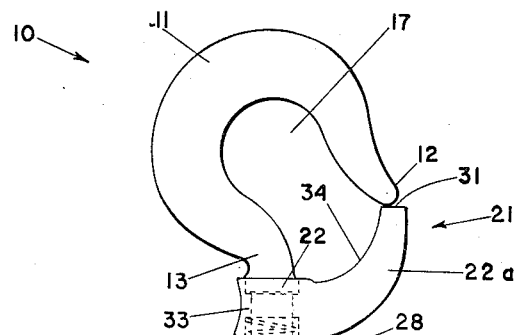
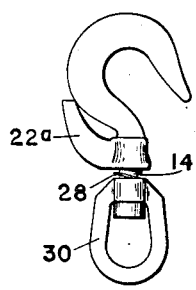
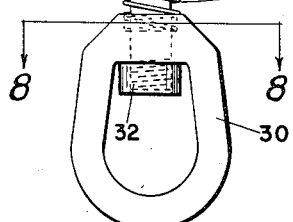
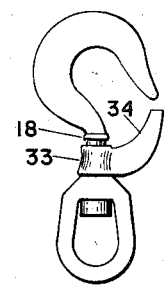
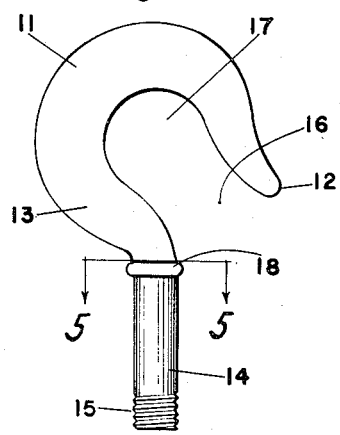
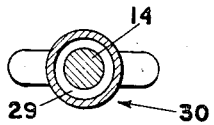
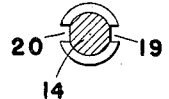
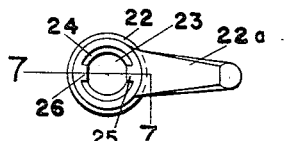
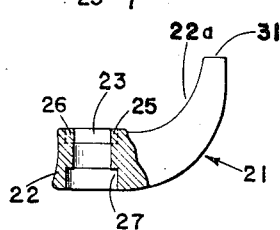
INVENTOR.
WILFRED W. ANDERSON
BY
ATT'YS

United States Patent Office 2,783,518
Patented Mar. 5, 1957

2,783,518

SNAP HOOK

Wilfred W. Anderson, Lynnfield Center, Mass., assignor to Boston & Lockport Block Company, East Boston, Mass., a corporation of Massachusetts Application April 1, 1955, Serial No. 498,550

1 Claim. (Cl. 24—241)

This invention pertains to snap hooks. While the principle of the invention may be utilized in snap hooks of any kind, the invention is of a special utility when embodied in hooks of substantial size such as are used, for example, in hoisting apparatus or in other situations where ropes, cables or other elements of substantial diameter must be held within the bend of the hook.

Snap hooks are designed to prevent accidental escape of a part from the bend of the hook and for this purpose usually comprise a keeper which is movable relatively to the hook proper and which normally guards the throat passage between the tip of the hook proper and the shank portion of the hook, this passage being that through which the rope or other element is entered into or withdrawn from the hook. Various forms of keeper have been employed, for example, a spring leaf fixed at one end to the shank of the hook and having its opposite or free end normally disposed close to the tip of the hook, said free end being separable from the hook tip by pressure to admit the insertion or withdrawal of a part from the bend of the hook. While for hooks of small size such an arrangement may be useful, it is not practical when the keeper is to be subjected to substantial stress during use.

One requirement of a practical device of this type is that the keeper be so designed and arranged that it will not move to inoperative position in response to force applied to its inner surface, for example, by the rope, cable or other part held within the hook proper. A further desirable characteristic is that the keeper be capable of removal from its normal operative position so as to leave the passage between the tip of the hook and its shank portion unobstructed to its full width and preferably with means for retaining the keeper in such inoperative position. A further desideratum is that the keeper be readily movable to inoperative position without necessitating the employment of tools, even though the rope, cable, or other element held within the hook may be pressed against the keeper, and with provision for preventing the keeper from accidentally turning about the shank of the hook as an axis while in use, so as to open the throat. It is also highly desirable that, when being moved from operative to inoperative position, the keeper move away from the tip of the hook rather than toward the latter so that regardless of the position of the rope or cable within the bend of the hook, the movement of the keeper will not be interfered with by the rope or cable. It is also desirable that the hook be of simple, rigid construction and dependable in use.

The principal object of the present invention is to provide a hook having the above desirable characteristics. Other and further objects and advantages of the invention will be pointed out in the following more detailed description and by reference to the accompanying drawings, wherein:

Fig. 1 is a side elevation of a snap hook embodying the present invention showing the keeper in the position of use;

Fig. 2 is a view similar to Fig. 1, but to smaller scale, showing the keeper retracted from its locked position and disposed in readiness to be removed to a position such as to leave the passage between the shank and tip of the hook completely open;

Fig. 3 is a view similar to Fig. 2, but showing the keeper as having been turned through 180° from its normal position and locked in place;

Fig. 4 is a side elevation of the hook proper, omitting other parts;

Fig. 5 is a section, to larger scale, on the line 5—5 of Fig. 4;

Fig. 6 is a plan view of the keeper removed from the hook proper;

Fig. 7 is a side elevation, partly in vertical section, on the line 7—7 of Fig. 6, and Fig. 8 is a plan view of the swivel or shackle which forms a part of the completed hook.

Referring to the drawings, the numeral 10 designates a snap hook embodying the present invention, the hook proper (Fig. 4) comprising the bend portion 11, here shown as having a curvature of approximately 250°, the tip 12 and the shank portion 13 which merges integrally with the cylindrical stem 14 which is screw-threaded at its lower end. At the point where the shank merges with the stem 14, the hook is provided with an integral circumferential boss 18 (here shown, Figs. 2 and 4, as substantially semi-circular in radial section) which, at diametrically opposite points (Fig. 5), is provided with vertical slots or channels 19 and 20 respectively. The tip 12 and shank 13 of the hook are spaced apart as shown to provide between them the throat passage 16 which leads to the space 17 within the bend of the hook.

The keeper 21 (Figs. 1, 6 and 7) is a rigid member, for example, a metal casting comprising the base or body portion 22 and a curved gate portion 22ª, having a bore 23 in the body portion of a diameter to receive the stem 14 of the hook with an easy sliding fit. At its upper part this bore 23 is enlarged, as shown at 24 (Fig. 6), to receive the annular boss 18 when the keeper is in a normal operative position as shown in Fig. 1. Projecting into this enlarged portion 24 of the bore are integral, diametrically opposite locking lugs 25 and 26, which as shown, Fig. 7, are of a depth substantially equalling the depth of the boss 18, and which, at times, are designed to engage the slots 19 and 20 in the boss 18, thus preventing the keeper from turning about the axis of the stem 14.

The bore 23 in the part 22 is provided with an integral shoulder 27 (Fig. 7) forming an abutment for the upper end of a coiled compression spring 28 (Fig. 1) whose lower end is seated against a shoulder 29 (Fig. 8) in a bore in the shackle member 30. A nut 32, Fig. 1, engaging the screw-threaded lower end 15 of the stem 14 holds the shackle 30 in assembled relation to the hook proper and forms a lower, limiting stop for the keeper, the bore 31 in the shackle being of such diameter as to permit the shackle to turn freely about the axis of the stem 14.

When the keeper 21 is in the normal operative position, its free end portion 31 is located so close to the tip 12 of the hook as effectively to close the throat 16 so that a part held within the bend of the hook cannot accidentally escape therefrom. Preferably the base portion 22 of the keeper is provided, throughout the major portion at least of its circumference, with a shallow peripheral channel 33 to provide a finger grip by means of which the keeper may be slid down along the stem 14 in opposition to the action of the spring 28 for a distance sufficient to disengage the lugs 25 and 26 from the slots 19 and 20, it being noted that the undersurface of the part 22 of the keeper is normally spaced upwardly from the upper surface of the shackle 30 a distance sufficient to permit downward motion of the keeper to disengage the locking lugs from the slots of the boss 18. As may be noted from inspection of Fig. 4, the depth of the boss 18 is relatively small, for instance, approximately ⅓ of the diameter of the stem 14, so that only a little downward motion of the keeper is necessary to unlock it. After the keeper has been moved down to disengage the locking lugs from the slots, the keeper may then be turned freely about the axis of the stem 14, for example, through an angle of 90° and then released, whereupon the spring will force the part 22 upwardly against the boss 18, thus frictionally holding the keeper in this position while leaving the throat 16 free and unobstructed. It should be noted that in moving the keeper downwardly toward the shackle it is moving away from the rope or other element held within the bend of the hook, so that presence of the rope in no way interferes with this retraction of the keeper to inoperative position. If it be desired to retain the keeper positively in inoperative position for any reason, the keeper may be turned through an angle of 180°, after disengaging the locking lugs, so as to position it as shown in Fig. 3. If, when in this position the keeper is released, the spring will push the keeper upwardly and the locking lugs will again engage the slots 19 and 20, thus positively preventing the keeper from turning.

It will be noted that the keeper is so shaped that if for any reason the rope or cable within the bend of the hook should be drawn into the throat 16 so as to exert stress against the inner curved surface 34 of the keeper, the latter, acting as a lever, will be so cramped against the stem portion 14 of the hook that it cannot possibly slide down the stem and thus disengage the locking elements. This lever action is enhanced by reason of the fact that the distance between the enlargements 24 and 27 of the bore in the keeper is quite short, see Fig. 7, in fact, less than the diameter of the stem 14 of the hook proper, and this, together with the free fit of the stem 14 in the short bore 23 tends to cause the keeper to rock in response to pressure exerted against the inner surface of its curved arm, thus cramping the base portion of the keeper against the stem of the hook proper and preventing the keeper from moving bodily downward along the stem in response to such pressure. It will further be noted that under ordinary circumstances and when the keeper is not subjected to such internal pressure, the keeper may be moved to inoperative position by the application of force merely sufficient to compress the spring 28 and that no tools are necessary either for unlocking the keeper or for turning it to the inoperative position and, as already noted, the rotation of the keeper about the axis of the stem may be such as to leave the throat 16 wholly open and unobstructed while the only moving part, aside from the compressible spring, is the rigid unitary keeper. The device is thus a very simple construction, inexpensive to manufacture, dependable in operation and of very rugged construction.

While one desirable embodiment of the invention has herein been disclosed by way of example, it is to be understood that the invention is broadly inclusive of any modifications falling within the scope of the appended claim.

I claim:

A snap-action safety hook of the kind which comprises a hook proper, which is rigid and unitary and which has a bend exceeding 250° of arc, a tip portion, a shank, and a cylindrical stem, the extremity of the tip portion being spaced from the shank to provide a throat passage between them, and a unitary rigid keeper comprising a base having a bore which receives the stem portion of the hook proper with an easy sliding fit, and an arcuate gate portion whose free end is normally closely adjacent and directly opposed to the extremity of the tip portion of the hook proper, the base portion of the keeper being axially slidable and rotatable about the stem of the hook proper, a coiled spring urging the base of the keeper axially of the stem of the hook proper and toward the bend of the hook, and releasable locking means operative positively to hold the keeper in operative position, where it closes the throat passage of the hook proper, or alternatively, in an inoperative position diametrically opposite to its operative position, characterized in that a shackle is swivelled to the free end portion of the stem of the hook proper, said free end portion being screw-threaded, a nut engaging the screw threads on said stem and holding the shackle in place, the shackle having a recess in its upper end which receives one end of the spring and the bore in the base of the keeper having an enlargement at its lower end which receives the opposite end of the spring, the upper end of the bore in the base of the keeper also having an enlargement into which project diametrically opposite locking lugs, an annular boss integral with the stem of the hook proper and located adjacent to the junction of the stem and the shank portion of the hook proper, said boss being substantially semi-circular in radial section and of a depth, axially of the stem, of the order of ⅓ the diameter of the stem, said boss having diametrically opposite recesses for the reception of the locking lugs of the keeper, the base of the keeper being of such axial length as normally to provide sufficient clearance between it and the shackle to permit the lugs of the keeper to be disengaged from the recesses of the boss by sliding the keeper downwardly along the stem, the length of the bore in the base of the keeper being less than the diameter of the stem of the hook proper so that, when the interior of the curved arm of the keeper is subjected to pressure, the keeper tends to rock and cramp against the stem thereby preventing bodily downward motion of the keeper along the stem such as to release the locking elements, the base of the keeper having a shallow peripheral channel providing a finger grip.

References Cited in the file of this patent

UNITED STATES PATENTS

| 714,777 | Buck | Dec. 2, 1902 |
| 1,676,167 | Sprain | July 3, 1928 |

FOREIGN PATENTS

| 101,633 | Germany | Feb. 18, 1899 |
| 48,520 | Sweden | Feb. 9, 1921 |